United States Patent [19]
Petrucciani

[11] 3,962,994
[45] June 15, 1976

[54] DOG KENNEL MODULE
[75] Inventor: Ahlene M. Petrucciani, Brookfield, Ill.
[73] Assignee: Lawrence Peska Associates, Inc., New York, N.Y. ; a part interest
[22] Filed: Apr. 7, 1975
[21] Appl. No.: 565,858

[52] U.S. Cl. .................................................. 119/19
[51] Int. Cl.² ......................................... A01K 1/02
[58] Field of Search.......................... 119/19, 15, 17

[56] References Cited
UNITED STATES PATENTS
2,932,279  4/1960  Giles ................................. 119/19 X
3,557,756  1/1971  Ramsey .............................. 119/19
3,738,322  6/1973  Smith .............................. 119/17 X FOREIGN PATENTS OR APPLICATIONS
1,223,268  2/1971  United Kingdom ................... 119/19

Primary Examiner—Hugh R. Chamblee
Attorney, Agent, or Firm—Jack D. Slobod

[57] ABSTRACT
A dog kennel in the shape of a rectangular module has an end abutting an exterior wall of a building with a transparent window in the wall between the module and the building interior, so that a pet may be seen from the interior of the building. In one embodiment, adapted to home or motel use the window is a sliding door. In another embodiment adapted for use in public places such as a restaurant, the window is fixed and a door is provided on an outboard side of said module.

1 Claim, 4 Drawing Figures

U.S. Patent  June 15, 1976  3,962,994
PARKING AREA
PARKING AREA
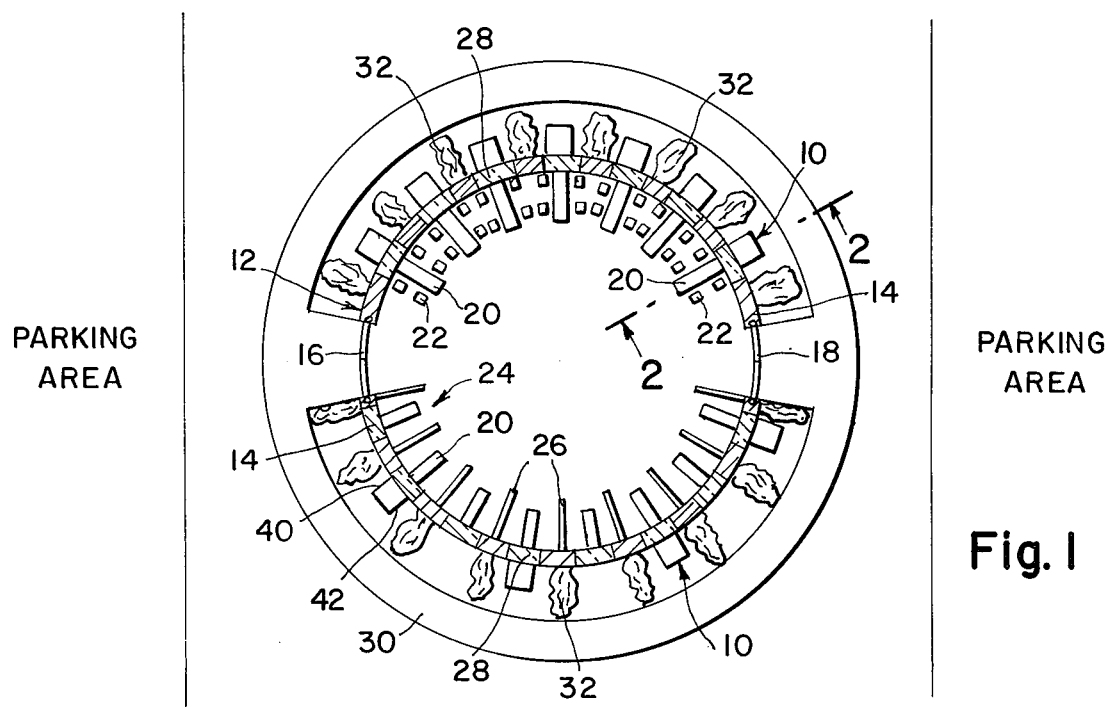
Fig. 1
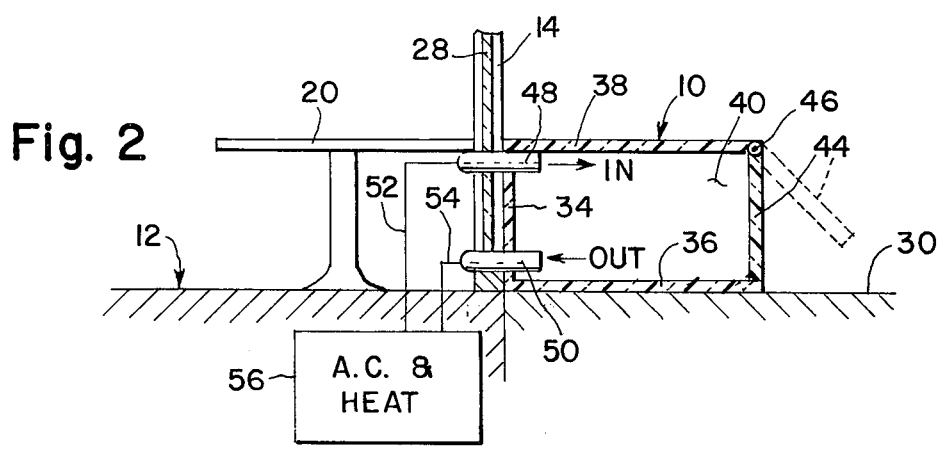
Fig. 2
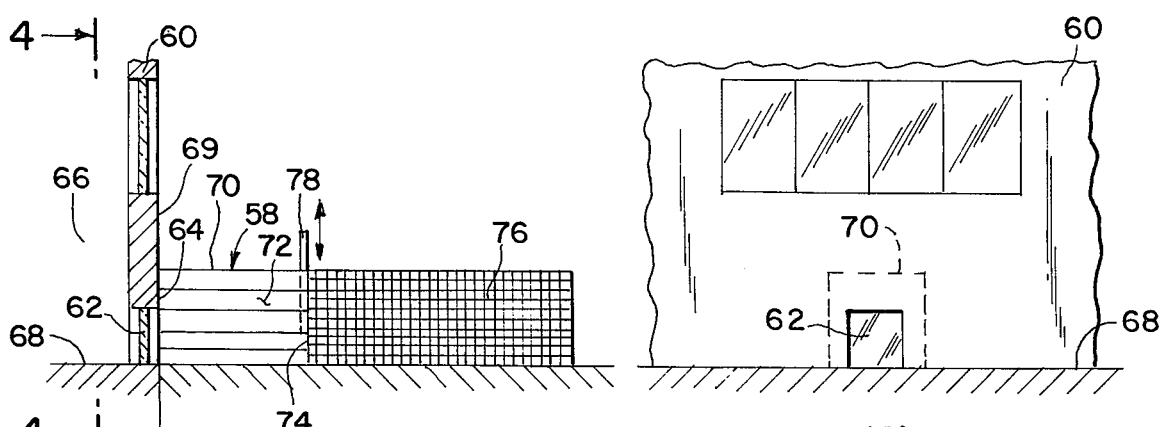
Fig. 3
Fig. 4

DOG KENNEL MODULE

FIELD OF THE INVENTION

The present invention relates generally to enclosures for pets. In its more particular aspects the present invention relates to the integration of a kennel with a building in a manner where said kennel abuts a transparent portion of an exterior wall of a building, to provide separate quarters for a pet and for occupants of a building while permitting mutual viewing.

BACKGROUND OF THE PRESENT INVENTION

Individuals who travel with pets find a great deal of difficulty because public places such as restaurants and stores have no facilities for the pets. It is only recently that some motels provide kennel facilities. As a result pets are typically left in automobiles or are tied near the public place. Leaving pets in such places, runs the risk that they will either be stolen or will suffer heat exhaustion.

Outside a home, dog houses or fenced enclosures are often provided for a pet. Such enclosures are not always useable because they are subject to the elements of weather and temperature. They also do not provide much opportunity for mutual view between the pet owner and the occupants of a home.

Furthermore, dog houses, fenced enclosures and the like often detract from the architecture of a home.

OBJECTS OF THE PRESENT INVENTION

It is an object of the present invention to provide a pet kennel which may be architecturally integrated with the exterior of a building.

It is another object of the present invention to provide a pet kennel which positioned with respect to a building in a manner providing mutual view between the interior of the building and the interior of the kennel.

It is a further object of the present invention to provide for a dog kennel in combination with a building, a means for maintaining said kennel climatically comfortable.

SUMMARY OF THE PRESENT INVENTION

Briefly, the aforementioned and other objects of the present invention are satisfied by providing a roofed, solid walled pet-sized module abutting an external wall of a building in which there is provided between the interior of the building and the interior of the kennel a transparent window. The window affords mutual viewing between the pet and the occupants of the building.

Accordng to one embodiment of my invention the exterior walls of the module are covered with the same siding as the building so that the module is in effect integrated with the building. In another embodiment, all the walls of the module are transparent allowing the pet to fulfill a security function while being in a comfortable environment out of the weather.

For home use the transparent window is configured as a door while for restaurant use the window is fixed and an outside entrance for the pet is provided on an outboard side of the module.

Other objects, features and advantages of the present invention will become apparent upon a perusal of the following detailed description of two embodiments of the present invention when taken in conjunction with the appended drawing wherein:

FIG. 1 is a plan view of a restaurant in combination with a plurality of the dog kennel of the present invention disposed along a wall of the restaurant;

FIG. 2 is an elevation cross-sectional view through the wall of the restaurant in FIG. 1 at the location of a dog kennel;

FIG. 3 is an elevation view partly in cross-section similar to FIG. 2 but of an alternate embodiment adapted for home use; and FIG. 4 is an elevation view from the lines 4—4 in FIG. 3.

DETAILED DESCRIPTION OF THE PREFERRED EMBODIMENTS

Referring first to FIGS. 1 and 2 I have chosen to illustrate a preferred embodiment of the dog kennel 10 of my invention for a public place in connection with a restaurant 12 configured in a circular shape. It should be understood that the principles of this embodiment of my invention are equally applicable to other public buildings such as stores and motels. The restaurant 12 is illustrated because it presents a very harmonious integration with the kennel 10.

The restaurant 12, as illustrated is preferably bounded by a cylindrical external wall and is provided with a diametrically opposed pair of entrances 16 and 18 through the wall 14 which in effect bisect the restaurant 12 into two semi-circular regions. In one region along the inner side of cylindrical wall 14 between the entrances are provided angularly spaced groupings of tables 20 and chairs 22. In the other semi-circular region are provided angularly spaced booth groupings 24 including tables 20 between dividers 26. In both the table and chair grouping and the booth groupings 24, the narrow end of tables 20 abut the inside of cylindrical wall 14 and a floor to ceiling window 28 is provided in the wall at each table end.

On the outside of cylindrical wall 14 and in abutting relationship thereto, a plurality of angularly spaced kennels 10 of the present invention are provided at the location of various tables 20. To complete the architectural integration of the restaurant 12 with the kennels 10, the restaurant 12 and the kennels spaced around it are encircled by a walk 30 which is intersected by the entrances 16 and 18. Further, there is provided shrubs 32 surrounding restaurant 12 and located angularly between the various kennels 10.

Referring specifically to FIG. 2 the kennel 10 comprises a solid walled generally rectangular module including a first transparent wall 34 as of plexiglass abutting the exterior of building wall 14 at the location of floor to ceiling windows 28 to enable therethrough mutual view between the pet in kennel 10 and the pet owners seated at the adjacent table 20. Kennel 10 is further provided with a solid floor 36 as of plastic, a solid roof 38, and outboard opposed side walls 40 and 42 (FIG. 1) and an outboard back wall 44 opposite wall 34.

To provide an outside entrance for the pet into kennel 10, since pets are normally not permitted in restaurants by health regulations, back wall 44 is configured as a door which is pivotly mounted for upward rotation by a hinge 46 connecting the top end of back wall 44 to the back end of roof 38.

If sufficient shade is afforded kennel 10 by the restaurant 12 and bushes 32, the roof 38, back wall 44 and sidewalls 40 and 42 of the kennel should be also constructed of transparent plastic to afford the pet a view of his surroundings and as well provide further view of the pet from table 20 through the portion of window 28 above the table and through the roof 38. On the other hand if the shade is insufficient back wall 44, sidewalls 40 and 42 and in particular the roof 38 should be constructed of a material that is congruous with the exterior of the building wall 14. For example, to this end, the aforementioned walls may be covered with the same siding as on the exterior of building wall 14.

To control the climate and temperature in kennel 10 and thereby provide a comfortable atmosphere for the pet therein inlet an exhaust air ducts 48 and 50 are provided through wall 14 and into the interior of kennel 10. The ducts 48 and 50 comprise branches respectively connected to main lines ducts 52 and 54 which lead to preferably a forced air combined air-conditioning and heating unit 56 within the restaurant 12.

Referring next to FIGS. 3 and 4 an alternate embodiment of a kennel 58 is shown in connection with a home or a motel. Therein a wall 60 of the house or motel is provided at its base with a small rectangular window or door 62 as of plexiglass in register with the end 64 of kennel 58 abutting the exterior of wall 60 to provide mutual view between the interior 66 of the house and the interior of the kennel 58. The window or door 62 goes down to the floor 68 while the top and sides of the window are within the rectangular cross-section 70 of kennel 56 so that the kennel may bear against the opaque more solid sections 69 of the exterior of wall 60.

In this embodiment, in contradistinction with that shown in FIG. 2, and in particular when transparent window 62 is a door for a pet, the end 64 of kennel 58 which abuts the wall 60 is an open end. In order that there be architectural harmony with the building, and in particular where the kennel 58 is inadequately shaded, the solid sides and roof of kennel 58 should be covered with the same siding material 72 as on the outside of wall 60. Otherwise, the walls and roof may be of transparent plastic.

To provide an exercise area for the pet, the back end 74 of kennel 58, which is in this event an open end, abuts in registry with an open end of an elongated fenced enclosure 76 having suitable enclosed area for pet exercise. Between the kennel 58 and enclosure 76 there is provided a vertically sliding door 78 for allowing the pet to pass from the kennel to the enclosure when the weather permits.

Having described two main embodiments of my invention, it should be appreciated that numerous modifications are possible within its spirit and scope. Accordingly, reference as to the scope of the invention should be made to the following claims.

What is claimed is:

1. A restaurant construction comprising: a generally circular building bounded by a generally cylindrical external wall; plural restaurant tables angularly spaced apart along and adjacent the inside of said wall; plural angularly spaced apart transparent solid windows in said wall at the locations of said tables; plural angularly spaced apart transparent solid walled and roofed elongated kennel modules extending radially from the external side of said wall respectively at the locations of said tables; said windows, transparent walls and roof permitting viewing the interior of said kennels from said respective tables; door means formed on an outboard end of said kennel modules for providing ingress to or egress from said kennel modules only from said outboard end; intake and exhaust ducts communicating from the interior to the exterior of said kennel modules; and a central heating and air conditioning system feeding said ducts.

\* \* \* \* \*